(12) United States Patent
Peters et al.

(10) Patent No.: US 12,270,966 B2
(45) Date of Patent: Apr. 8, 2025

(54) APPARATUS FOR DETERMINING AGRICULTURAL RELEVANT INFORMATION

(71) Applicant: BASF AGRO TRADEMARKS GMBH, Ludwigshafen am Rhein (DE)

(72) Inventors: Ole Peters, Langenfeld (DE); Sandra Selinger, Langenfeld (DE); Thomas Rommel, Langenfeld (DE); Silke Andree-Labsch, Cologne (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 149 days.

(21) Appl. No.: 16/770,352

(22) PCT Filed: Dec. 10, 2018

(86) PCT No.: PCT/EP2018/084156
§ 371 (c)(1),
(2) Date: Jun. 5, 2020

(87) PCT Pub. No.: WO2019/121097
PCT Pub. Date: Jun. 27, 2019

(65) Prior Publication Data
US 2021/0173120 A1 Jun. 10, 2021

(30) Foreign Application Priority Data
Dec. 21, 2017 (EP) ..................... 17209557

(51) Int. Cl.
*G01W 1/12* (2006.01)
*A01B 79/00* (2006.01)

(52) U.S. Cl.
CPC ............. *G01W 1/12* (2013.01); *A01B 79/005* (2013.01)

(58) Field of Classification Search
CPC .................. A01B 79/005; G01C 11/00; G01N 2033/245; G01N 21/27; G01N 21/4738;
(Continued)

(56) References Cited

U.S. PATENT DOCUMENTS

| 4,560,279 A | * 12/1985 | Kouns ...................... G01V 8/02 356/369 |
| 7,068,816 B1 | 6/2006 | Knoblauch et al. |

(Continued)

FOREIGN PATENT DOCUMENTS

| DE | 100 02 880 C1 | 6/2001 | |
| WO | WO-2013144150 A1 * | 10/2013 | ................ G01J 3/28 |
| WO | 2017/096073 A1 | 6/2017 | |

OTHER PUBLICATIONS

Park, Chris. A Dictionary of Environment and Conservation. : Oxford University Press, . Oxford Reference. Date Accessed Jun. 24, 2022 <https://www.oxfordreference.com/view/10.1093/acref/9780198609957.001.0001/acref-9780198609957>. (Year: 2012).*

(Continued)

*Primary Examiner* — Huy Q Phan
*Assistant Examiner* — Martin Walter Braunlich
(74) *Attorney, Agent, or Firm* — ArentFox Schiff LLP

(57) ABSTRACT

The present invention relates to an apparatus for determining agricultural relevant information in an agricultural environment. It is described to provide a processing unit with at least one image of an agricultural area. The at least one image corresponds with at least one area of the agricultural area. The at least one image comprises remotely acquired reflectance intensity data relating to a plurality of features on the ground. An image of the at least one image is of a first area of the agricultural environment. The processing unit is provided with at least one sensor data relating to the first area of the agricultural environment. The processing unit implements a radiation propagation model of the atmosphere (Continued)

that utilizes at least one model parameter. The processing unit determines modified at least one model parameter. The processing unit determines at least one agricultural relevant information for an examination area of the at least one area.

14 Claims, 4 Drawing Sheets

(58) Field of Classification Search
CPC .......... G01N 2021/4733; G06Q 50/02; G06Q 10/04; Y02A 40/00; G01J 3/28; G01J 1/16; G01J 2001/4276; G01J 2001/4266; G01J 2001/428; G01J 3/0286; G01J 5/804; G01W 1/12; G01W 1/10; G06T 7/0002; G06T 2207/10032; G06T 2207/30188; G06T 2207/10036; G06T 2207/10041; G06T 2207/30181; G06T 5/001; G06T 5/20; G06T 7/514; G06T 17/05; G06T 2200/24; G06T 2207/10024; G06T 2207/10028; G06T 2207/10048; G06T 2207/30168; G06T 7/90; G06T 7/97; G06N 7/005; A01C 21/005; A01D 91/00; A01G 25/00; A01G 22/00; A01G 25/167; G06V 20/188; G06V 10/26; G06V 10/803; G06V 10/993; G06V 20/13; G06V 20/17; G06V 20/194; G06V 20/38; G06V 20/64
See application file for complete search history.

(56) References Cited

U.S. PATENT DOCUMENTS

| | | | | |
|---|---|---|---|---|
| 9,489,576 | B2* | 11/2016 | Johnson | A01B 79/005 |
| 9,710,721 | B2* | 7/2017 | Ardouin | G06V 20/13 |
| 9,792,557 | B2* | 10/2017 | Mathur | G06N 7/01 |
| 9,959,507 | B2* | 5/2018 | Mathur | G06N 20/00 |
| 10,089,716 | B2* | 10/2018 | Chandra | G06T 3/4038 |
| 10,139,279 | B2* | 11/2018 | Pluvinage | G01N 33/025 |
| 10,192,185 | B2* | 1/2019 | Tomii | G06Q 50/02 |
| 10,585,210 | B2* | 3/2020 | Wolf | G01W 1/12 |
| 10,832,390 | B2* | 11/2020 | Pacifici | G06T 5/00 |
| 11,050,979 | B2* | 6/2021 | Gornik | A01B 79/005 |
| 11,062,223 | B2* | 7/2021 | Xu | G06Q 50/02 |
| 2014/0270332 | A1 | 9/2014 | Pacifici | |
| 2017/0061050 | A1 | 3/2017 | Mewes et al. | |
| 2017/0344845 | A1* | 11/2017 | Kaneko | G01N 21/27 |
| 2019/0095556 | A1* | 3/2019 | Satoh | G16H 50/50 |
| 2019/0179009 | A1* | 6/2019 | Klein | G01S 13/9023 |

OTHER PUBLICATIONS

English machine translation of WO-2013144150-A1 (Year: 2013).*
Dusseux, P., Vertès, F., Corpetti, T., Corgne, S., & Hubert-moy, L. (2014). Agricultural practices in grasslands detected by spatial remote sensing. Environmental Monitoring and Assessment, 186(12), 8249-65. doi:https://doi.org/10.1007/s10661-014-4001-5 (Year: 2014).*
International Search Report for International Application No. PCT/EP2018/084156 mailed Jun. 3, 2019, 3 pgs.

* cited by examiner

APPARATUS FOR DETERMINING AGRICULTURAL RELEVANT INFORMATION

FIELD OF THE INVENTION

The present invention relates to an apparatus for determining agricultural relevant information, to a system for determining agricultural relevant information, and to a method for determining agricultural relevant information, as well as to a computer program element.

BACKGROUND OF THE INVENTION

The general background of this invention is the utilization of sensor acquired data to provide a farmer with an understanding of what is occurring in their agricultural fields. Information derived from satellite acquired imagery does not have the accuracy to provide the farmer with the necessary information (whether calibrated or not) to make decisions on how to manage their fields and the crops in them, because the atmosphere cannot be modelled at a required level. Furthermore, ground based sensor acquired data can be very accurate, but does not provide the required coverage over different fields of a farm and within specific fields.

SUMMARY OF THE INVENTION

It would be advantageous to have improved means for determining agricultural relevant information.

The object of the present invention is solved with the subject matter of the independent claims, wherein further embodiments are incorporated in the dependent claims. It should be noted that the following described aspects and examples of the invention apply also to the apparatus for determining agricultural relevant information, to the system for determining agricultural relevant information, and to the method for determining agricultural relevant information.

According to a first aspect, there is provided an apparatus for determining agricultural relevant information in an agricultural environment, comprising:

an input unit; and
a processing unit.

The input unit is configured to provide the processing unit with at least one image of an agricultural area. The at least one image was acquired by at least one satellite and/or at least one aerial vehicle such that the at least one image was acquired through a substantial depth of the Earth's atmosphere. The at least one image corresponds with at least one area of the agricultural area such that each image of the at least one image corresponds to a different area of the agricultural area. The at least one image comprises remotely acquired reflectance intensity data relating to a plurality of features on the ground. An image of the at least one image is of a first area of the agricultural environment. The input unit is configured to provide the processing unit with at least one sensor data relating to the first area of the agricultural environment, wherein the at least one sensor data was acquired by at least one ground based and/or at least one near ground based sensor. The processing unit is configured to implement a radiation propagation model of the atmosphere that utilizes at least one model parameter. The at least one model parameter comprises at least one atmospheric scattering coefficient. The processing unit is configured also to determine a modified at least one model parameter. The determination comprises utilisation of the radiation propagation model, the remotely acquired reflectance intensity data of the image of the first area and the at least one sensor data relating to the first area. The processing unit is configured to determine at least one agricultural relevant information for an examination area of the at least one area. The determination comprises utilization of the radiation propagation model, the modified at least one model parameter and an image of the at least one image that is of the examination area of the at least one area.

In other words, a radiation propagation model such as a radiative transfer model, or dark object subtraction can utilize ground truth information to augment the model variables, thereby enabling acquired imagery to be corrected and used to provide agricultural relevant information.

In an example, the at least one model parameter comprises at least one atmospheric absorption coefficient.

In an example, the at least one model parameter comprises at least one polarization state of radiation propagating through the atmosphere.

In other words, ground truth information is used to correct an atmospheric radiation propagation model that has operated on an image of an area for which that ground truth information is available, and this enables modified model parameters to be determined for the radiation propagation model that can then be used by the radiation propagation model to determine accurate agricultural relevant information for acquired imagery both of that area and of other areas.

In this manner, images from a satellite of different locations and/or images of different satellites of the same areas or of different areas can be corrected in order that they can provide equivalent imagery that would have been acquired by the same satellite through a non-perturbing atmosphere. Thus, not only can agricultural relevant information be acquired for areas that provides absolute quantitative values, but such quantitative agricultural information can be provided from different image acquisition systems on the basis of an image acquired from one system that also has ground (or near ground) based sensor acquired data too. Thus, for example absolute biomass information can be provided from satellite and plane acquired imagery of agricultural areas.

To put this another way, by directly measuring the properties of the surface or of the atmosphere near to the surface, a better understanding of the composition of the atmosphere (that filters through to model parameters such as scattering and absorption coefficients and the polarization of radiation) can be used to fine tune the parameters needed by the correction algorithm operating as part of a radiation propagation model. Then this knowledge can be used for this and other scenes where no additional data is available.

In an example, the examination area is the first area and the processing unit is configured to determine a modified image of the first area. The determination comprises utilization of the radiation propagation model and the modified at least one model parameter and the acquired image of the first area.

In an example, the examination area is a second area of the plurality of areas that is different to the first area and wherein an image of the at least one image is of the second area. The processing unit is configured to determine a modified image of the second area. The determination comprises utilization of the radiation propagation model and the modified at least one model parameter and the acquired image of the second area.

In an example, the at least one sensor data comprises sensor reflectance intensity data relating to at least one of the plurality of features on the ground.

In other words, the sensor on the ground or near to the ground is acquiring reflectance data of features on the ground through an insubstantial depth of the Earth's atmosphere. Thus, the reflectance data can be considered to be insignificantly modified by the atmosphere between the sensor and the ground.

In an example, the remotely acquired reflectance intensity data comprises spectral data and the sensor reflectance intensity data comprises spectral data.

In this manner, by knowing the true reflected intensity at the surface of the earth (in one or all frequency bands), by comparing an image that has been corrected by a radiative transfer algorithm (or a dark object subtraction model) to a ground-truth image with true reflected intensities on one or more wavelength bands, enables fine tuning of the parameters (absorption and scattering coefficients) used in the radiative transfer algorithm. This knowledge can then be transferred to that and other scenes, even where no ground-truth data is available.

In an example, at least one sensor image comprises the sensor reflectance intensity data.

In other words, a sensor of the at least one sensor can be a camera, which can be a camera with spectral capabilities. This could be a RGB camera, or a hyperspectral camera that for example could have nm resolution over a visible wavelength range, over a near infrared wavelength range, over a mid-infrared wavelength range or over more than one of these wavelength ranges.

In an example, the at least one sensor data comprises one or more of: temperature data; air pressure data; humidity data; air composition; aerosol density data; aerosol composition; particle composition; spectral data relating to sunlight incident at the first area.

In other words, real values for temperature, air pressure, humidity, the composition of the air (where there can be different gases present, such as $O_3$, $O_2$, $N_2O$, $CH_4$ and other molecules that have absorption bands in the detected spectral range, and where there can be water vapour and or dust in the air), and particle composition such as the shape of particles in the air, that can lead to polarization effects when radiation is scattered, and aerosol content in the air can be used to correct the radiative transfer model (or dark object subtraction model), and as these real values relate to the atmosphere near to the ground where it is thickest and where absorption and scattering processes are accordingly most prevalent (scattering for the DOS model), such data leads to improved analysis from the radiative transfer model (or dark object subtraction model).

In an example, the at least one model parameter comprises one or more of: temperature data; air pressure data; humidity data; air composition; aerosol density data; aerosol composition; particle composition.

In other words, an atmospheric model of the atmosphere can utilise parameters, information relating to some of which (temperature data; air pressure data; humidity data; aerosol density data) can be directly determined by ground based sensors, and some of which (atmospheric scattering and absorption coefficients and radiation polarization state) can be indirectly determined on the basis of acquired ground based imagery, and this information can be used to correct the atmospheric model in order that acquired imagery can be better used to provide agriculturally relevant information.

In an example, determination of the at least one agricultural relevant information for the examination area comprises determination of at least one biomass indication.

In an example, the first image was acquired at substantially the same time as the at least one sensor data.

In an example, the examination area is an area other than the first area, and wherein the image of the at least one image that is of the examination area was acquired at substantially the same time as the at least one sensor data.

According to a second aspect, there is provided a system for determining agricultural relevant information in an agricultural environment, comprising:

at least one ground based and/or at least one near ground based sensor;

an apparatus for determining agricultural relevant information in an agricultural environment according to the first aspect; and an output unit.

The at least one ground based and/or at least one near ground based sensor is configured to acquire the at least one sensor data. The output unit is configured to output the at least one agricultural relevant information.

According to a third aspect, there is provided a method for determining agricultural relevant information in an agricultural environment, comprising:

a) providing a processing unit with at least one image of an agricultural area, wherein the at least one image was acquired by at least one satellite and/or at least one aerial vehicle such that the at least one image was acquired through a substantial depth of the Earth's atmosphere, wherein the at least one image corresponds with at least one area of the agricultural area such that each image of the at least one image corresponds to a different area of the agricultural area; and wherein the at least one image comprises remotely acquired reflectance intensity data relating to a plurality of features on the ground; and wherein, an image of the at least one image is of a first area of the agricultural environment;

b) providing the processing unit with at least one sensor data relating to the first area of the agricultural environment, wherein the at least one sensor data was acquired by at least one ground based and/or at least one near ground based sensor;

c) implementing by the processing unit a radiation propagation model of the atmosphere that utilizes at least one model parameter, wherein the at least one model parameter comprises at least one atmospheric scattering coefficient;

d) determining by the processing unit modified at least one model parameter, the determination comprising utilising the radiation propagation model, the remotely acquired reflectance intensity data of the image of the first area and the at least one sensor data relating to the first area; and e) determining by the processing unit at least one agricultural relevant information for an examination area of the at least one area, the determination comprising utilizing the radiation propagation model, the modified at least one model parameter and an image of the at least one image that is of the examination area of the at least one area.

According to another aspect, there is provided a computer program element for controlling an apparatus of the first aspect and/or system according to the second aspect, which when executed by a processor is configured to carry out the method of the third aspect.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
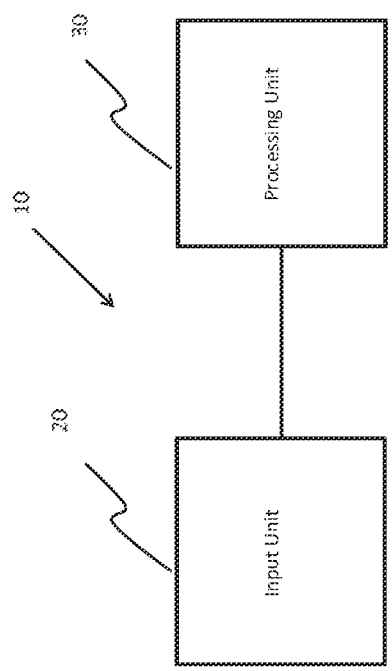
FIG. 1 shows a schematic set up of an example of an apparatus for determining agricultural relevant information.

FIG. 1 shows an example of an apparatus 10 for determining agricultural relevant information in an agricultural environment. The apparatus 10 comprises an input unit 20 and a processing unit 30. The input unit is 20 configured to provide the processing unit 30 with at least one image of an agricultural area. The at least one image was acquired by at least one satellite and/or at least one aerial vehicle such that the at least one image was acquired through a substantial depth of the Earth's atmosphere. The at least one image corresponds with at least one area of the agricultural area such that each image of the at least one image corresponds to a different area of the agricultural area. The at least one image also comprises remotely acquired reflectance intensity data relating to a plurality of features on the ground. An image of the at least one image is of a first area of the agricultural environment. The input unit 20 is configured also to provide the processing unit 30 with at least one sensor data relating to the first area of the agricultural environment. The at least one sensor data was acquired by at least one ground based and/or at least one near ground based sensor. The processing unit 30 is configured to implement a radiation propagation model of the atmosphere that utilizes at least one model parameter. The at least one model parameter comprises at least one atmospheric scattering coefficient. The processing unit 30 is configured also to determine a modified at least one model parameter.

The determination comprises utilisation of the radiation propagation model, the remotely acquired reflectance intensity data of the image of the first area and the at least one sensor data relating to the first area. The processing unit 30 is configured also to determine at least one agricultural relevant information for an examination area of the at least one area, wherein the determination comprises utilization of the radiation propagation model, the modified at least one model parameter and an image of the at least one image that is of the examination area of the at least one area.

According to an example, the at least one model parameter comprises at least one atmospheric absorption coefficient.

According to an example, the at least one model parameter comprises at least one polarization state of radiation propagating through the atmosphere.

In an example, the radiation propagation model is a dark object subtraction model.

In an example, the radiation propagation model is a radiative transfer model.

In an example, the examination area is the first area. In other words, imagery of an area is used with a radiative transfer model or dark object subtraction model and ground truth data for that area to enable corrected or modified variables for the model (atmospheric scattering coefficients and if necessary absorption coefficients and polarization) to be determined that then enables that image to be better interpreted in order to provide accurate agricultural relevant information.

In an example, the at least one image comprises a plurality of images, and the examination area is a different area to the first area. In other words, imagery of an area is used with a radiative transfer model or dark object subtraction model and ground truth data for that area to enable corrected or modified variables for the model to be determined that then enables another image of a different area to be analysed in order to provide accurate agricultural relevant information.

In an example, the radiative transfer model comprises the 6SV1 algorithm. In an example, the radiative transfer model comprises the RT3 (radiative transfer) algorithm. In an example, the radiative transfer model comprises the MODTRAN (moderate resolution atmospheric transmittance and radiance) algorithm. In an example, the radiative transfer model comprises SHARM (spherical harmonics) algorithm. In an example, other atmospheric transmittance and absorption and reflectance algorithms can be utilized. In an example, the radiative transfer model comprises a combination of two or more of these algorithms. More detail on the 6SV1 algorithm can be found in the papers by S. Y. Kotchenova et al: "Validation of a vector version of the 6S radiative transfer code for atmospheric correction of satellite data. Part I: path radiance," Appl. Opt. 45, 6762-6774 (2006) and S. Y. Kotchenova et al: "Validation of a vector version of the 6S radiative transfer code for atmospheric correction of satellite data. Part II: Lambertian and anisotropic surfaces," Appl. Opt. 46, 4455-4464 (2007). More details on the MODTRAN algorithm can be found in the paper by A. Berk et al: "MODTRAN4" radiative transfer modelling for atmospheric 0correction," Proc. SPIE 3756, 348-353 (1999). More details on the RT3 algorithm can be found in the paper by K. F. Evans and G. L. Stephans: "A new polarized atmospheric radiative transfer model," J. Quant. Spectrosc. Radiat. Transfer 46, 413-423 (1991). More details on the SHARM algorithm can be found in the papers by T. Z. Muldashev et al: "Spherical harmonics method in the problem of radiative transfer in the atmosphere—surface system," J. Quant. Spectrosc. Radiat.Transfer 61, 393-404 (1999) and A. I. Lyapustin: "Radiative transfer code SHARM for atmospheric and terrestrial application," Appl. Opt. 44, 7764-7772 (2005).

More details on dark object subtraction models can be found in the paper by P. S. Chavez Jr, "An improved dark-object subtraction technique for atmospheric scattering correction for multispectral dat." Remote Sensing of Environment, 24, 459-479 (1988).

According to an example, the examination area is the first area and the processing unit is configured to determine a modified image of the first area, wherein the determination comprises utilization of the radiation propagation model and the modified at least one model parameter and the acquired image of the first area.

According to an example, the examination area is a second area of the plurality of areas that is different to the first area and wherein an image of the at least one image is of the second area. The processing unit is configured to determine a modified image of the second area. The determination comprises utilization of the radiation propagation model and the modified at least one model parameter and the acquired image of the second area.

According to an example, the at least one sensor data comprises sensor reflectance intensity data relating to at least one of the plurality of features on the ground.

In an example, the at least one sensor acquiring the reflectance data comprises passive sensing, which can involve imaging. Thus, the reflectance data being acquired relates to sunlight that has passed through the atmosphere to features on the ground, with radiation being reflected from the features and then that reflected radiation propagates to the at least one sensor through a minimal depth of atmosphere. Thus, in effect a radiation propagation model such as a radiative transfer model or dark object subtraction model can be used to correct for atmospheric scattering (and atmospheric absorption and polarization effects for the radiative transfer model) relating to sunlight that has propagated through the atmosphere to features on the ground and that reflects from the features on the ground and that reflected radiation then propagates back through the atmosphere possibly in a different direction and angle with different polarization and different spectral power distribution to the incident radiation to a remote sensor for example on a satellite.

This is achieved because in effect the radiative transfer model with idealised absorption and scattering coefficients (and idealised polarization state information), with these parameters also being a function of height above the ground, can be used to determine idealised reflectance intensity data for features on the ground. But ground based sensor acquired reflectance data provides data that has not suffered the absorption and scattering of radiation (and other atmospheric perturbing effects) in going from the features on the ground to the remote detection system. Thus through comparing the idealised reflectance data, determined using the radiative transfer model, with the ground based (or near ground based) reflectance data, the idealised absorption and scattering coefficients can be modified until the reflectance data for the features produced by the model is consistent with sunlight that has passed through the atmosphere reflected from the features and immediately been detected. The same applies for polarization, and for the correction being applied to the incoming radiation from the sun and the outgoing radiation propagating to the remote sensing platform—such as a satellite. Thus, the radiative transfer model (or dark object subtraction model) now has corrected or modified absorption and scattering coefficients and polarization (and scattering coefficients for the DOS model) that can be applied to other remotely acquire imagery in order to provide more correct reflectance data, that relates to no atmospheric absorption or scattering. This is because the effect of the sunlight passing through the atmosphere to features on the ground can also be corrected. Such, accurate, corrected, reflectance data for features on the ground such as the leaves of crop plants can be used to determine accurate agricultural relevant information, such as a biomass index.

Similarly, a dark object subtraction model, that assumes that a dark object on the ground has zero reflectance, can be modified to provide results that matches the actually acquired ground truth data, and that model can then be applied to remotely acquired imagery to determine agricultural relevant information.

In an example, the at least one sensor acquiring the reflectance data comprises active sensing, which can involve imaging. Thus for example, a sensor can emit radiation that is reflected from the ground and that reflected radiation is detected. This could be a single wavelength, or have spectral content. But, this ground truth information has suffered next to no atmospheric perturbation, and can be used to correct the radiative transfer model to provide more correct, modified, absorption and scattering coefficients.

According to an example, the remotely acquired reflectance intensity data comprises spectral data and the sensor reflectance intensity data comprises spectral data.

According to an example, at least one sensor image comprises the sensor reflectance intensity data. According to an example, the at least one sensor data comprises one or more of: temperature data; air pressure data; humidity data; air composition; aerosol density data; aerosol composition; particle composition; spectral data relating to sunlight incident at the first area.

In an example, the at least one sensor data comprises data acquired at a plurality of heights above the ground.

By providing data with vertical fidelity, a rough first degree understanding of the scaling of the atmosphere with altitude is provided, enabling for more accurately correction of the radiative transfer algorithm.

In other words, a skyward looking spectrometer acquires a spectrum of the incident sunlight. This ground truth data can be used in its own right to correct the radiative transfer model, and provide modified absorption and scattering coefficients and radiation polarization (or correct the dark object subtraction model and provide modified scattering coefficients). However, when the sensor data also comprises reflectance data from features on the ground, that can be monochromatic or multi-spectral, this data along with the sunlight spectrum can be used to provide improved correction for the radiative transfer model (or DOS model), because the effects of the atmosphere can be completely corrected for, enabling accurate and quantitative imagery of the ground to be acquired form remotely platforms such as satellites, from which quantitative agricultural relevant information can be determined.

According to an example, the at least one model parameter comprises one or more of: temperature data; air pressure data; humidity data; air composition; aerosol density data; aerosol composition; particle composition.

According to an example, determination of the at least one agricultural relevant information for the examination area comprises determination of at least one biomass indication.

In an example, determination of the at least one biomass indication comprises determination of at least one Normalized Difference Vegetation Index.

According to an example, the first image was acquired at substantially the same time as the at least one sensor data.

According to an example, the examination area is an area other than the first area, and the image of the at least one image that is of the examination area was acquired at substantially the same time as the at least one sensor data.

In an example, each image of the at least one image of the agricultural area was acquired at substantially the same time as the at least one sensor data.

By acquiring ground based sensor data at the same time as satellite acquired imagery, it can be ensured that the same environmental conditions apply with respect to satellite or aeroplane acquired imagery and with respect to the ground based sensor data.

Figure 2:
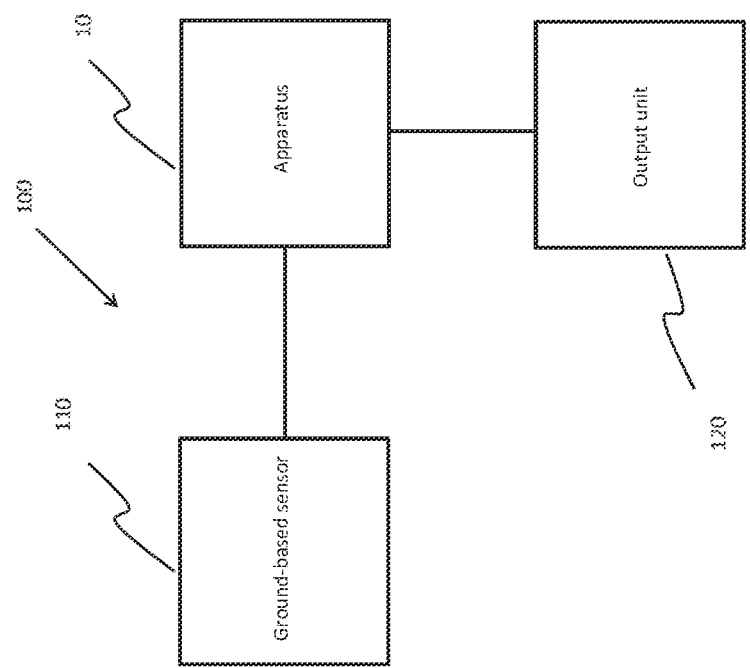
FIG. 2 shows a schematic set up of an example of a system for determining agricultural relevant information.

FIG. 2 shows an example of a system 100 for determining agricultural relevant information in an agricultural environment. The system 10 comprises at least one ground based and/or at least one near ground based sensor 110 and an apparatus 10 for determining agricultural relevant information in an agricultural environment as described with respect to FIG. 1. The system also comprises an output unit 120. The at least one ground based and/or at least one near ground based sensor 110 is configured to acquire the at least one sensor data. The output unit 120 is configured to output the at least one agricultural relevant information.

Figure 3:
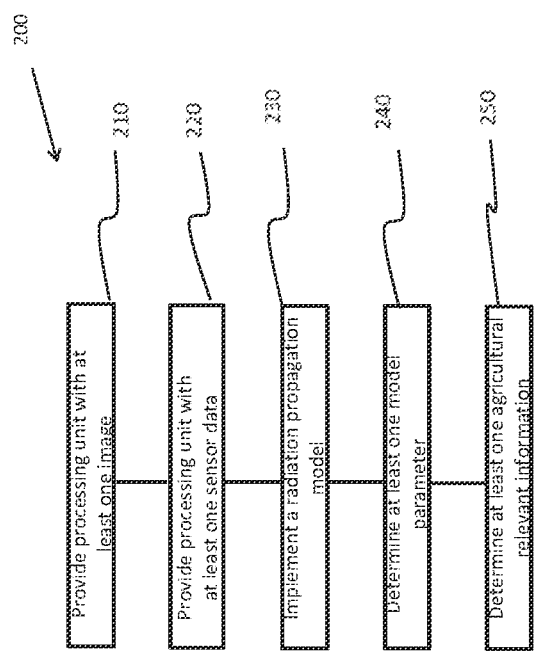
FIG. 3 shows a method for determining agricultural relevant information.

FIG. 3 shows a method 200 for determining agricultural relevant information in an agricultural environment in its basic steps. The method 200 comprises:

in a providing step 210, also referred to as step a), providing a processing unit with at least one image of an agricultural area. The at least one image was acquired by at least one satellite and/or at least one aerial vehicle such that the at least one image was acquired through a substantial depth of the Earth's atmosphere. The at least one image corresponds with at least one area of the agricultural area such that each image of the at least one image corresponds to a different area of the agricultural area. The at least one image comprises remotely acquired reflectance intensity data relating to a plurality of features on the ground; and wherein, an image of the at least one image is of a first area of the agricultural environment; in a providing step 220, also referred to as step b), providing the processing unit with at least one sensor data relating to the first area of the agricultural environment. The at least one sensor data was acquired by at least one ground based and/or at least one near ground based sensor; in an implementing step 230, also referred to as step c), implementing by the processing unit a radiation propagation model of the atmosphere that utilizes at least one model parameter. The at least one model parameter comprises at least one atmospheric scattering coefficient; in a determining step 240, also referred to as step d), determining by the processing unit modified at least one model parameter. The determination comprises utilising the radiation propagation model, the remotely acquired reflectance intensity data of the image of the first area and the at least one sensor data relating to the first area; and in a determining step 250, also referred to as step e), determining by the processing unit at least one agricultural relevant information for an examination area of the at least one area. The determination comprises utilizing the radiation propagation model, the modified at least one model parameter and an image of the at least one image that is of the examination area of the at least one area.

In an example, the at least one atmospheric parameter comprises at least one atmospheric absorption coefficient.

In an example, the at least one model parameter comprises at least one polarization state.

In an example, the examination area is the first area and wherein step e) comprises determining a modified image of the first area, the determination comprising utilizing the radiation propagation model and the modified at least one model parameter and the acquired image of the first area.

In an example, the examination area is a second area of the plurality of areas that is different to the first area and wherein an image of the at least one image is of the second area, and wherein step e) comprises determining a modified image of the second area, the determination comprising utilization of the radiation propagation model and the modified at least one model parameter and the acquired image of the second area.

In an example, the at least one sensor data comprises sensor reflectance intensity data relating to at least one of the plurality of features on the ground.

In an example, the remotely acquired reflectance intensity data comprises spectral data and the sensor reflectance intensity data comprises spectral data.

In an example, at least one sensor image comprises the sensor reflectance intensity data.

In an example, the at least one sensor data comprises one or more of: temperature data; air pressure data; humidity data; aerosol density data.

In an example, the at least one sensor data comprises data acquired at a plurality of heights above the ground.

In an example, determination of the at least one agricultural relevant information for the examination area comprises determination of at least one biomass indication.

In an example, determination of the at least one biomass indication comprises determination of at least one Normalized Difference Vegetation Index.

In an example, the first image was acquired at substantially the same time as the at least one sensor data.

In an example, the examination area is an area other than the first area, and wherein the image of the at least one image that is of the examination area was acquired at substantially the same time as the at least one sensor data.

Figure 4:
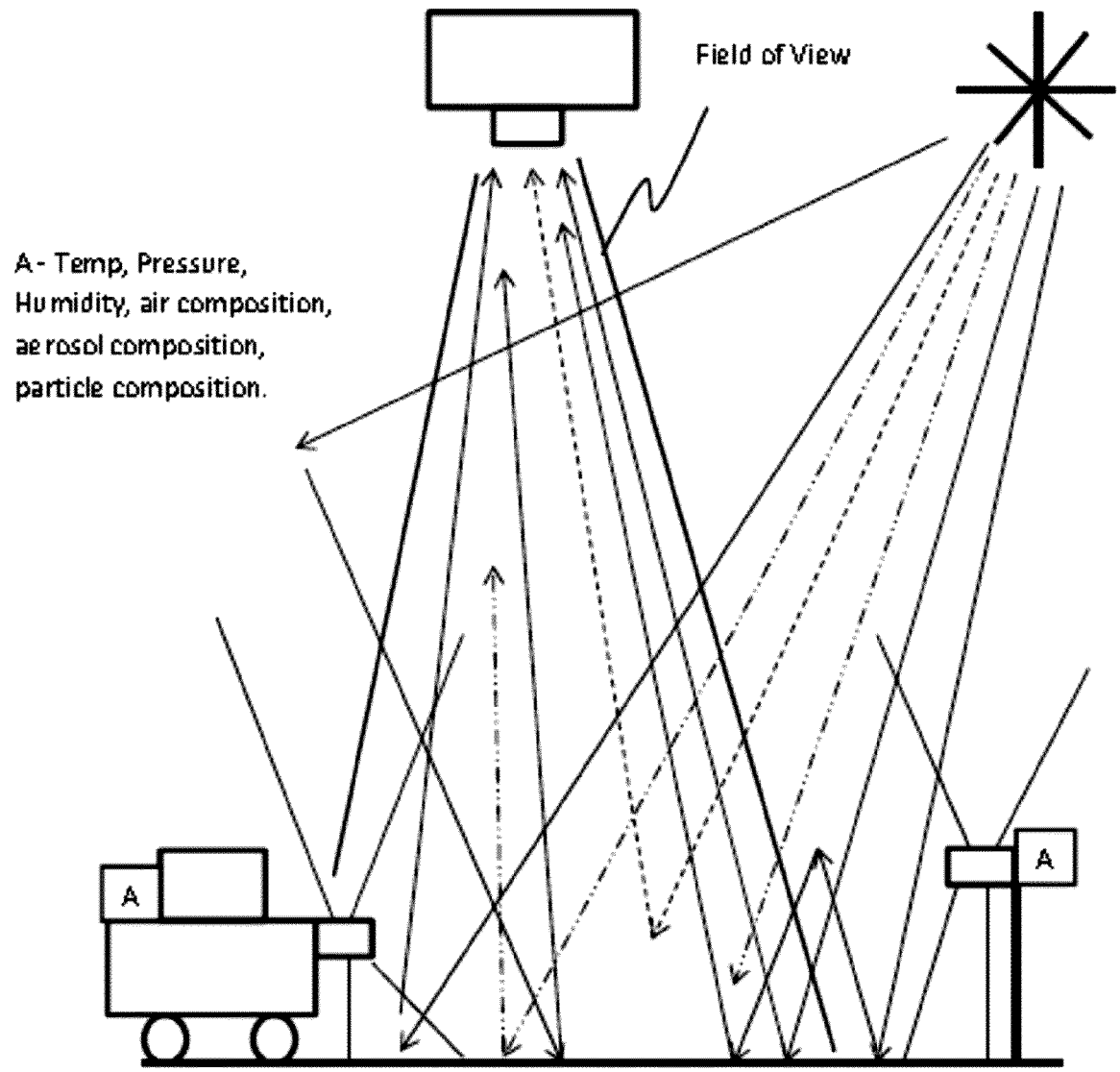
FIG. 4 shows a schematic diagram of a detailed example of a system for determining agricultural relevant information.

FIG. 4 shows a detailed example of a system for determining agricultural relevant information. A farmer is in a field and operates farm machinery, such as a tractor. The tractor has a suite of sensors. One set of sensors provides information on the air temperature, the air pressure, and the humidity. The sensors also determine the air composition, in terms of the different gases present, and aerosol composition, and particle composition in the air. Another sensor on the machinery acquires hyperspectral imagery of the ground including that of the crop in the field.

Another sensor looks skyward and takes a spectrum of the incident radiation illuminating the field and the crop. The farm machinery has a GPS sensor to log the position when these sensor data were acquired. In the field, there is also positioned a stationary sensor that acquires the same data that the farm machinery acquires, but only at one location.

Also shown in FIG. 4 is a satellite that is flying overhead. The satellite acquires imagery of the field and surrounding fields as it passes by. The satellite's camera acquires hyperspectral imagery. The time of acquisition of the satellite imagery is logged.

The farmer logs onto his computer and wishes to know how different crops across his farm are progressing, to assess if remedial action, or some other action, is required. A crop can vary within a field, and the same crop can vary from field to field. One way the farmer can do this is to use hyperspectral imagery of the crop in the field to determine a Normalized Difference Vegetation Index from which a biomass indication can be determined. However, the farmer has not visited certain parts of his farm for quite a while, and does not have enough stationary sensor systems to provide him with the fidelity of data he requires. Satellite imagery can be used to determine hyperspectral reflectance data for the crop, by correcting for the atmosphere using a radiative transfer model of the atmosphere for example—dark object subtraction could also be used. This means that processing of the satellite acquired imagery attempts to correct for atmospheric perturbation to provide "real" hyperspectral data for the crop. However, as shown in FIG. 4 the acquisition of imagery by a satellite is extremely complicated. Sunlight as it passes through the atmosphere is scattered and absorbed on its way to the ground. Indeed, some radiation will scatter in the atmosphere and be detected by the camera of the satellite without interacting with the ground. The incident radiation reflects off radiation, with radiation being absorbed and reflected based on the properties of the crop—this is what the farmer actually wants. Then, the radiation propagates away from the ground, and is again scattered and absorbed before being detected by the satellite's camera. The polarization of the radiation as it progresses through the atmosphere can also change due to scattering of particles for example, and this can change how it is subsequently absorbed and scattered. The radiative transfer model attempts to correct for these processes to provide the farmer with the real reflectance data for his crop. From which a biomass indication can be calculated. However, the corrections are not good enough for his needs because the atmosphere, especially that close to the ground, can only be approximated by the radiative transfer model and a real atmosphere that deviates away from such an ideal atmosphere leads to significant deviations in the "real" determined crop reflectance data.

Therefore, the computer the farmer uses is actually an apparatus as described above with respect to FIG. 1. A program uses the sensor acquired data from his field, such as the real reflectance data of the crop and the spectrum of the incident radiation, and also uses the air temperature, the air pressure, and the humidity, the air composition, in terms of the different gases present, and aerosol composition, and particle composition in the air. This program uses the satellite acquired imagery for that day, ideally as close as possible in time to the time when the ground based sensor data was acquired. However, if for example there was cloud cover when a satellite passed overhead half an hour ago, but the sky was clear a few hours earlier or indeed on a previous day, then that satellite imagery is used as long as the weather conditions were similar. The program, then uses the ground based sensor data and a radiative transfer model to modify how the radiative transfer model is modelling the atmosphere, until a hyperspectral image of the crop acquired by the satellite, at the location of a ground based sensor, matches a hyperspectral image of the crop acquired by that ground based sensor system. In effect, the model parameters of the radiative transfer model are varied until a match is found. In one way, a minimization procedure is performed until there is a match. A number of different methods can be used to vary the model parameters until a match is found. Thus, there are a number of different techniques that can be undertaken in a number of different ways to obtain modified model parameters.

The radiative transfer model with the modified parameters, can then operate on imagery of the field away from where the ground based sensor data was acquired, and even in other parts of the farm where no ground based sensor data has been acquired. But using its modified model of the atmospheric perturbation, that is using the modified model parameters, the acquired imagery can be used to provide a much better representation of the real hyperspectral data for the crop at these locations. This data can then be used by the farmer to determine a biomass indication, or otherwise gain an understanding of how the crop is progressing and remedial action can be taken, such as applying a fertilizer, watering, applying a herbicide or insecticide, or a fungicide, or different seeds/varieties/seed-coatings in an upcoming season, or changing management practices for example. The farmer can also use this information to decide to harvest the crop. Or indeed imagery of a field with no crop can be acquired and used to determine when to plant a crop.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are recited in mutually different dependent claims does not indicate that a combination of these measures cannot be used to advantage. Any reference signs in the claims should not be construed as limiting the scope.

The invention claimed is:

1. An apparatus for determining agricultural relevant information in an agricultural environment, comprising: an input unit; and a processing unit; wherein, the input unit is configured to provide the processing unit with at least one image of an agricultural area, wherein the at least one image was acquired by at least one satellite and/or at least one aerial vehicle such that the at least one image was acquired through a substantial depth of the Earth's atmosphere, wherein the at least one image corresponds with at least one area of the agricultural area such that each image of the at least one image corresponds to a different area of the agricultural area; and wherein the at least one image comprises remotely acquired reflectance intensity data relating to a plurality of features on the ground; wherein, an image of the at least one image is of a first area of the agricultural environment; wherein, the input unit is configured to provide the processing unit with at least one sensor data relating to the first area of the agricultural environment, wherein the at least one sensor data was acquired by at least one ground based and/or at least one near ground based sensor, and wherein the at least one sensor data comprises data acquired at a plurality of heights above the ground; wherein, the processing unit is configured to implement a radiation propagation model of the atmosphere that utilizes at least one model parameter, wherein the at least one model parameter comprises at least one or more of temperature data or air pressure data, wherein the at least one or more of the temperature data or air pressure data was acquired by a ground based sensor and/or a near ground based sensor; wherein, the processing unit is configured to determine a modified at least one model parameter, wherein the determination comprises utilisation of the radiation propagation model, the re-motely acquired reflectance intensity data of the image of the first area and the at least one sensor data relating to the first area; and wherein, the processing unit is configured to determine at least one agricultural relevant information for an examination area, wherein the determination comprises utilization of the radiation propagation model, the modified at least one model parameter and an image of the at least one image that is of the examination area, wherein the examination area is a second area of the agricultural environment that is different to the first area and where the at least one sensor data is acquired, wherein the image of the at least one image that is of the examination area was acquired at substantially the same time as the at least one sensor data to provide a match between the image of the at least one image and the at least one sensor data, and wherein the at least one agricultural relevant information for the examination area comprises a biomass index.

2. The apparatus of claim 1, wherein the at least one model parameter comprises at least one atmospheric absorption coefficient.

3. The apparatus of claim 1, wherein the at least one model parameter comprises at least one polarization state of radiation propagating through the atmosphere.

4. The apparatus of claim 1, wherein the examination area is the first area and the processing unit is configured to determine a modified image of the first area, wherein the determination comprises utilization of the radiation propagation model and the modified at least one model parameter and the acquired image of the first area.

5. The apparatus of claim 1, wherein an image of the at least one image is of the second area, and wherein the processing unit is configured to determine a modified image of the second area, wherein the determination comprises utilization of the radiation propagation model and the modified at least one model parameter and the acquired image of the second area.

6. The apparatus of claim 1, wherein the at least one sensor data comprises sensor reflectance intensity data relating to at least one of the plurality of features on the ground.

7. The apparatus of claim 6, wherein the remotely acquired reflectance intensity data comprises spectral data and the sensor reflectance intensity data comprises spectral data.

8. The apparatus of claim 6, wherein at least one sensor image comprises the sensor reflectance intensity data.

9. The apparatus of claim 1, wherein the at least one sensor data comprises one or more of: temperature data; air pressure data; humidity data; air composition; aerosol density data; aerosol composition; particle composition; spectral data relating to sunlight incident at the first area.

10. The apparatus of claim 1, wherein the at least one model parameter further comprises one or more of: humidity data; air composition data; aerosol density data; aerosol composition; particle composition.

11. The apparatus of claim 1, wherein determination of the at least one agricultural relevant information for the examination area comprises determination of at least one biomass indication.

12. The apparatus of claim 1, wherein the first image was acquired at substantially the same time as the at least one sensor data.

13. A system for determining agricultural relevant information in an agricultural environment, comprising: at least one ground based and/or at least one near ground based sensor; an apparatus for determining agricultural relevant information in an agricultural environment according to claim 1; and an output unit; wherein, the at least one ground based and/or at least one near ground based sensor is configured to acquire the at least one sensor data; and wherein, the output unit is configured to output the at least one agricultural relevant information.

14. A method for determining agricultural relevant information in an agricultural environment, comprising: a) providing a processing unit with at least one image of an agricultural area, wherein the at least one image was acquired by at least one satellite and/or at least one aerial vehicle such that the at least one image was acquired through a substantial depth of the Earth's atmosphere, wherein the at least one image corresponds with at least one area of the agricultural area such that each image of the at least one image corresponds to a different area of the agricultural area; and wherein the at least one image comprises remotely acquired reflectance intensity data relating to a plurality of features on the ground; and wherein, an image of the at least one image is of a first area of the agricultural environment; b) providing the processing unit with at least one sensor data relating to the first area of the agricultural environment, wherein the at least one sensor data was acquired by at least one ground based and/or at least one near ground based sensor, and wherein the at least one sensor data comprises data acquired at a plurality of heights above the ground; c) implementing by the processing unit a radiation propagation model of the atmosphere that utilizes at least one model parameter, wherein the at least one model parameter comprises at least one or more of temperature data or air pressure data, wherein the at least one or more of the temperature data or air pressure data was acquired by a ground based sensor and/or a near ground based sensor; d) determining by the processing unit modified at least one model parameter, the determination comprising utilising the radiation propagation model, the remotely acquired reflectance intensity data of the image of the first area and the at least one sensor data relating to the first area; and e) determining by the processing unit at least one agricultural relevant information for an examination area, the determination comprising utilizing the radiation propagation model, the modified at least one model parameter and an image of the at least one image that is of the examination area, wherein the examination area is a second area of the agricultural environment that is different to the first area and where the at least one sensor data is acquired, wherein the image of the at least one image that is of the examination area was acquired at substantially the same time as the at least one sensor data to provide a match between the at least one image and the at least one sensor data, and wherein the at least one agricultural relevant information for the examination area comprises a biomass index.

\* \* \* \* \*